United States Patent Office 3,476,922
Patented Nov. 4, 1969

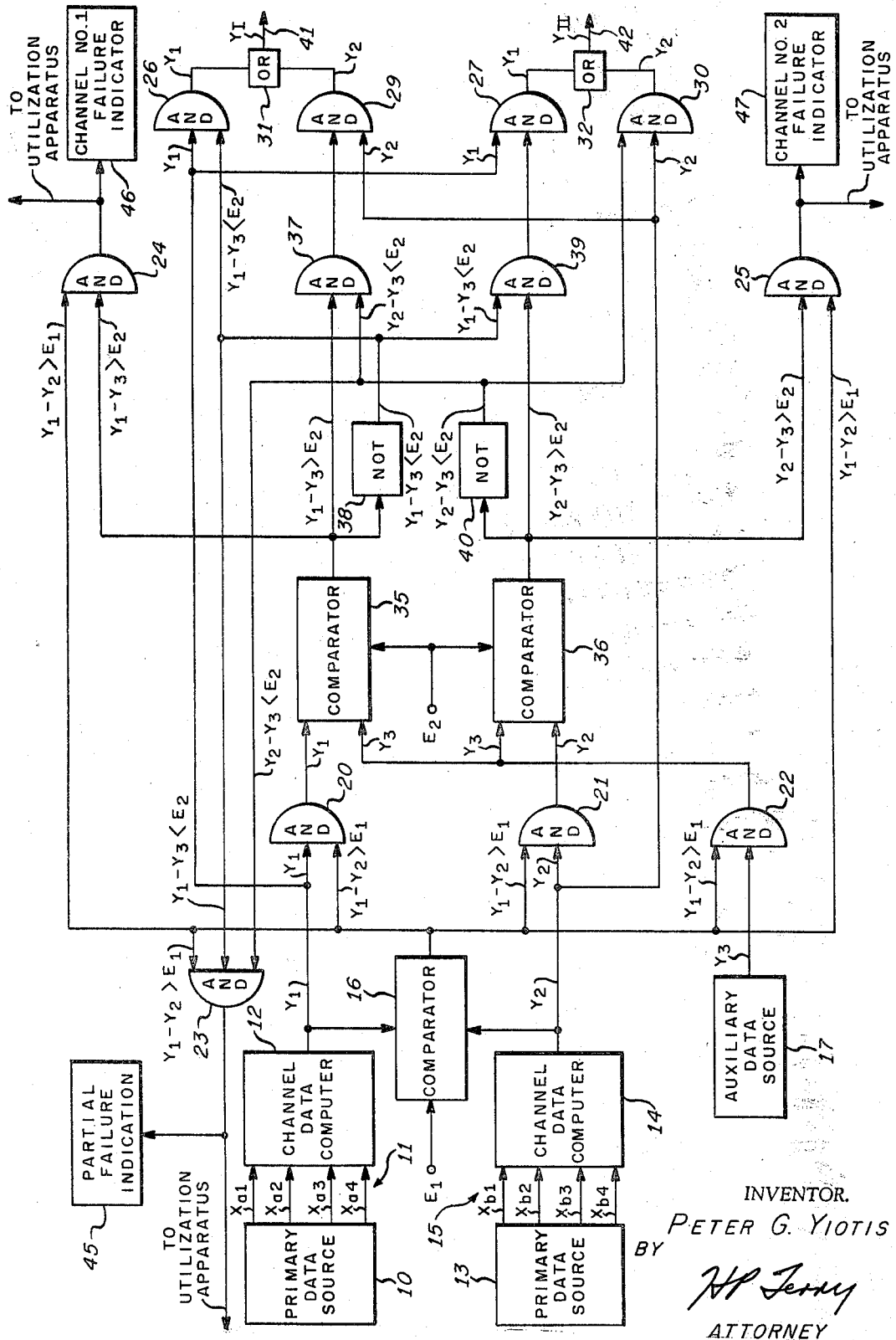

3,476,922
FAILURE MONITOR FOR REDUNDANT
CHANNEL SYSTEMS
Peter G. Yiotis, Astoria, N.Y., assignor to Sperry Rand
Corporation, a corporation of Delaware
Filed Aug. 5, 1966, Ser. No. 570,645
Int. Cl. G06f 11/08
U.S. Cl. 235—153                                    6 Claims

ABSTRACT OF THE DISCLOSURE

A failure monitor for data systems having first and second identical primary data sources each providing a plurality of identical primary data signals to respective first and second data channels for producing first and second composite signals respectively which are identical in normal operation. An auxiliary data source provides a third composite signal substantially identical to each of the first and second composite signals in normal operation. A first comparison circuit responsive to the first and second composite signals provides a first comparison signal when the difference between the first and second composite signals exceeds a first predetermined threshold. Transmission gates are included for transmitting the first, second and third composite signals to provide first, second and third gated composite signals respectively in response to the first comparison signal. A second comparison circuit responsive to the first, second and third gated composite signals provides a second comparison signal when the difference between the first and third gated composite signals exceeds a second predetermined threshold and provides a third comparison signal when the difference between the second and third gated composite signals exceeds a third predetermined threshold. Gating circuits responsive to the comparison signals provide a discrete measure representative of a malfunctioning data channel.

---

This invention relates to failure monitoring in information and control systems of the type using dual identical or redundant data channels.

It is desirable in certain information or control systems, particularly in aircraft where safety is a primary consideration, to have two identical channels each being supplied with identical information and providing under normal conditions identical outputs. The inputs may be common to both channels or they may be independently generated signals but in either event they normally are provided from primary sources of control data. These primary sources of data are usually accurate, complex and expensive. An example of such equipment is the dual flight instrumentation and navigation systems provided in aircraft. When dual channel systems of this type are utilized, the reliability of such systems can be significantly increased if a failure in one of the channels or a portion thereof can be immediately and unambiguously detected and corrected or the malfunctioned portion of the system rendered inoperative in order that it does not affect the remainder of the other normally operating channel which would assume control of the system.

To accomplish this in accordance with the present invention, a third data signal which represents the same variable as the signal from the primary channels is utilized but it is preferably derived from either a completely independent auxiliary sensory source or by means of an independent computation. This auxiliary source of information in accordance with the present invention can theerfore be less accurate, complex and expensive than the primary data sources.

Previous monitoring systems have utilized triply redundant primary data sources and/or data channels for failure identification in prior art systems. Each component or channel is identical and their outputs are equally weighted in the comparison process to determine failure or malfunction. Thus, the prior art systems are normally limited to those critical applications where high reliability is necessitated and the penalty is increased complexity, size, weight, and extremely high cost.

In contrast, the present invention utilizes unequal weighting of the signals to be compared for monitoring purposes thereby resulting in a simplified and less expensive system design which achieves an efficacious monitoring function. The present invention utilizes a modified majority rule logic for providing failure indication of either of the primary data channels or a partial failure indication depending upon the logic indications. Based upon the monitoring signals provided, any portion of or an entire channel can be rendered inoperative selectively.

It is therefore a primary object of the present invention to provide a failure monitoring system which provides a discrete monitoring function of redundant data channels.

It is a further object of the present invention to provide a failure monitor for redundant channel systems which provides selective monitoring functions of all or a portion of the system.

It is an additional object of the present invention to provide a failure monitor for a system having identical plural channels which discretely monitors all or portions of the system without requiring the complexity and expense of a like plurality of primary data sources.

These and other objects of the present invention will become apparent by referring to the specification and drawing in which the single figure shows an electrical schematic diagram in block form of a failure monitor incorporating the present invention.

A first primary data source 10, such as may be found in an aircraft to provide control signals representative of craft attitude, beam displacement, beam rate and/or functions of acceleration, provides signals indicated as $X_{a1}$, $X_{a2}$, $X_{a3}$ and $X_{a4}$. These control and damping signals are coupled in a first data channel 11 to a channel data computer 12. Typically, the computer 12 mixes, filters and shapes the signals from the primary data source 10 to provide a composite control signal $Y_1$ which is then used to control the appropriate aircraft control surface to maintain or command the aircraft to achieve a predetermined flight path or which is then used to control a display. In a similar manner, a second primary data source 13 which includes identical data sensors or which may be connected to utilize common data signal generating apparatus provides primary data signals $X_{b1}$, $X_{b2}$, $X_{b3}$ and $X_{b4}$ to a second channel data computer 14 which in turn provides a composite control signal $Y_2$ thereby representing a second identical data channel 15 providing identical data information to the appropriate control surface or display under normal operating conditions.

It will be appreciated that the primary data sources 10 and 13 may include extremely complex equipment such as three axis gyroscopically stabilized platforms to provide precise attitude and navigation information. It will be further appreciated that in lieu of a third redundant channel it would be desirable to provide a third composite signal by means of which the two primary channels may be monitored but from a considerably less expensive and complex sensor source. Alternatively, the third composite signal may be computed on the basis of information provided in the primary data signals but combined in a manner different from that of the computers 12 and 14 and then subsequently made equivalent to the composite signals $Y_1$ and $Y_2$ under normal conditions. The auxiliary composite signal $Y_3$ is such a signal in that it is provided either directly from a relatively simple sensor shown as an auxiliary data source 17 or computed and made equivalent to the composite signals $Y_1$ and $Y_2$ with which it is to be compared. The primary composite signals $Y_1$ and $Y_2$ are coupled to a comparator circuit 16 which is also responsive to a threshold signal $E_1$ in order that the output of the comparator 16 provides a signal representative of the difference between the primary composite signals $Y_1$ and $Y_2$ with respect to the threshold established by the signal $E_1$. If the threshold established by the signal $E_1$ is not exceeded by the difference between the signals $Y_1$ and $Y_2$, the comparator provides a binary zero output whereas if the difference therebetween exceeds the threshold, a binary one output is provided. The output of the comparator 16 is connected to AND gate circuits 20, 21, 22, 23, 24 and 25. The primary composite signals $Y_1$ and $Y_2$ are also applied to the AND gate circuits 20 and 21, respectively, while the auxiliary composite signal $Y_3$ is applied to the AND gate 22. The AND gates may be analog or digital type gates depending upon the type of signals applied thereto.

The composite signal $Y_1$ is also applied to AND gates 26, 27 while the $Y_2$ signal is applied to AND gates 29 and 30. The output of the AND gate 20 is connected to a comparator circuit 35 while the ouput of the AND gate 21 is connected to a similar comparator 36. The output of the AND gate 22 is connected to the comparators 35 and 36. The AND gate circuits 20, 21 and 22 transmit the $Y_1$, $Y_2$ and $Y_3$ signals to the comparators 35 and 36 whenever comparator 16 provides a binary ONE output and inhibit transmission therethrough whenever comparator 16 provides a binary ZERO output signal. The comparators 35 and 36 are also responsive to a threshold signal $E_2$ in order that the comparator 35 provides an output representative of the difference between the composite signals $Y_1$ and $Y_3$ with respect to the threshold established by the signal $E_2$. Similarly, the comparator 36 provides a signal representative of the difference between the composite signals $Y_2$ and $Y_3$ with respect to the threshold $E_2$. The comparator 35 provides a binary zero signal when the difference between the signals $Y_1$ and $Y_3$ does not exceed the threshold $E_2$ and a binary one when it does. Similarly, the comparator 36 provides a binary zero signal when the difference between the signals $Y_2$ and $Y_3$ does not exceed the threshold $E_2$ and a binary one when it does. The comparator 35 is coupled to the AND gate 24, an AND gate 37 and through a NOT circuit 38 to AND gates 23, 26 and 39. The comparator 36 is connected to the AND gates 25 and 39 and through a NOT circuit 40 to AND gates 23, 30 and 37. The NOT circuits 38 and 40 insure against a failure of the signal $Y_3$. The AND gates 37 and 39 are connected to AND gates 29 and 27, respectively. The output terminals of the AND gates 26 and 29 are coupled through an OR gate 31 to provide a common output lead 41 on which an output signal $Y_I$ may appear. Similarly, the output terminals of the AND gates 27 and 30 are connected through an OR gate 32 to a common output lead 42 on which an output signal $Y_{II}$ may appear. Outputs exist on the aforementioned AND gates when the respective input signals are in a binary one state.

The AND gate 23 is connected to a partial failure indicator 45 and may also be connected to provide a signal to other utilization apparatus as indicated by the legend. The AND gate 24 is connected to a channel #1 failure indicator 46 and is connected to utilization apparatus while the AND gate 25 is similarly connected to a channel #2 failure indicator 47 and is connected to utilization apparatus.

In operation, the thresholds $E_1$ and $E_2$ are usually constants having a magnitude dependent upon the maximum allowable errors of the $Y_1$, $Y_2$ and $Y_3$ signals under the transient and steady state conditions expected under normal operation. Thus, $E_1$ is usually set greater than the sum of the maximum allowable $Y_1$ and $Y_2$ errors while $E_2$ is set greater than the sum of the maximum allowable $Y_1$ and $Y_3$ or $Y_2$ and $Y_3$ errors respectively. The threshold $E_2$ is normally set greater than the threshold $E_1$ since the maximum allowable $Y_1$ and $Y_3$ or $Y_2$ and $Y_3$ errors normally exceed the maximum allowable $Y_1$ and $Y_2$ error. This is a consequence of selecting the auxiliary data source 17 less accurate than the primary data sources 10 and 13.

Assuming both data channels 11 and 15 are operating normally thereby providing composite signals $Y_1$ and $Y_2$ respectively having a difference less than that established by the threshold $E_1$, the comparator 16 then provides a binary zero output signal which prevents the AND gates 20, 21 and 22 from passing the $Y_1$, $Y_2$ and $Y_3$ signals respectively. It also prevents the AND gates 23, 24 and 25 from passing any signals. The comparators 35 and 36 continue to provide binary zero output signals which are passed through NOT circuits 38 and 40 to AND gates 26 and 30 respectively. This permits the $Y_1$ and $Y_2$ signals appearing on the other input terminals of the AND gates 26 and 30 respectively to be passed therethrough thereby providing signals $Y_1$ and $Y_2$ on the leads 41 and 42 respectively.

It will be appreciated that in the absence of the present invention although one of the data channels or a portion thereof may have failed, a mere comparison of the $Y_1$ and $Y_2$ channels will not provide a discrete basis for determining which channel is operating normally and which one is operating abnormally.

Assuming a malfunction in the primary data source 10, the data channel computer 12 or any portion of the data channel 11 such that the $Y_1$ signal is excessive, there will appear at the output terminal of the comparator 16 a binary one signal which is applied with the $Y_1$ signal to the AND gate 20. The AND gate 20 therefore provides a signal representative of $Y_1$ to the comparator 35 where it is compared with the $Y_3$ signal. The difference between the signals $Y_1$ and $Y_3$ exceeds the threshold established by $E_2$ thereby providing a binary one output signal energizing one input terminal of the AND gates 24 and 37. The comparison of the signals $Y_2$ and $Y_3$ in the comparator 36 provides a binary zero signal which is passed through the NOT circuit 40 to energize the other input terminal of the AND gate 37 which then energizes one input terminal of the AND gate 29. The other input terminal of the AND gate 29 is energized by the $Y_2$ signal which is functioning normally. The $Y_2$ signal is passed through the AND gate 29 thereby providing a $Y_2$ output signal on output lead 41 to control the aircraft control surface. The $Y_1$ signal is blocked by the AND gates 26 and 27 since the conditions required to energize the other input terminals of those AND gates are not present, i.e., $Y_1-Y_3<E_2$ for 26 and that plus $Y_2-Y_3>E_2$ for 27 via 39. The other terminal of the AND gate 24 is provided a binary one signal of $Y_1-Y_3$ being greater than $E_2$ from the comparator 35 thereby providing a channel #1 failure indication on the indicator 46 and providing a failure signal to the utilization apparatus associated with the channel #1.

It will be readily appreciated that efficacious monitoring of the following combinations of events is possible utilizing the failure monitor of the present invention:

(1) $\qquad Y_1-Y_2<E_1$ use both $Y_1$ and $Y_2$ (2) $\qquad Y_1-Y_2>E_1, \; Y_1-Y_3>E_2, \; Y_2-Y_3<E_2$ use $Y_2$ exclusively, channel #1 failure indication provided by indicator 46.

(3) $\qquad Y_1-Y_2>E_1, \; Y_1-Y_3<E_2, \; Y_2-Y_3>E_2$ use $Y_1$ exclusively, channel #2 failure indication provided by indicator 47.

(4) $Y_1-Y_2>E_1$, $Y_1-Y_3<E_2$, $Y_2-Y_3<E_2$

The probability is that the comparator 16 failed, continue to use both $Y_1$ and $Y_2$, partial failure indication is provided by indicator 45.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In data systems having first and second identical primary data source means each providing a plurality of identical primary data signals to respective first and second data channel means for producing first and second composite signals respectively, said first and second composite signals being identical in normal operation,
   (a) auxiliary data source means for providing a third composite signal substantially identical to each of said first and second composite signals in normal operation,
   (b) first comparison means responsive to said first and second composite signals for providing a first comparison signal when the difference between said first and second composite signals exceeds a first predetermined threshold,
   (c) transmission gating means responsive to said first, second and third composite signals and to said first comparison signal for transmitting said first, second and third composite signals to provide first, second and third gated composite signals respectively in response to said first comparison signal.
   (d) second comparison means responsive to said first, second and third gated composite signals for providing a second comparison signal when the difference between said first and third gated composite signals exceeds a second predetermined threshold and for providing a third comparison signal when the difference between said second and third gated composite signals exceeds a third predetermined threshold wherein said second threshold and said third threshold differ in magnitude from said first threshold, and
   (e) means including gating means responsive to said comparison signals for providing a discrete measure representative of the malfunctioning data channel.

2. The data system of the character described in claim 1 in which said second comparison means includes first and second comparator circuits, said first comparator circuit being responsive to said third gated composite signal and to said first gated composite signal for providing said second comparison signal and said second comparator circuit being responsive to said third gated composite signal and to said second gated composite signal for providing said third comparison signal.

3. The data system of the character recited in claim 1 in which said means including gating means includes a first AND gating circuit responsive to said first and second comparison signals for providing a measure representative of malfunction with respect to said first data channel means.

4. The data system of the character recited in claim 1 in which said means including gating means includes a second AND gating circuit responsive to said first and third comparison signals for providing a measure representative of malfunction with respect to said second data channel means.

5. The data system of the character recited in claim 1 in which said means including gating means includes a third AND gating circuit responsive to said first comparison signal and additional signals representative of the difference between said first and third composite signals being less than said second threshold and the difference between said second and third composite signals being less than said third threshold for providing an indication of partial failure of said system.

6. The data system of the character recited in claim 1 in which said means including gating means includes a fourth AND gating circuit means responsive to said first and second composite signals and to said second and third comparison signals for rendering the normal operating ones of said first and second composite signals effective and for rendering the malfunctioning ones of said first and second composite signals ineffective.

References Cited

UNITED STATES PATENTS

| 3,243,585 | 3/1966 | Escobosa | 328—152 X |
| 3,293,607 | 12/1966 | Dalbfell | 325—304 X |
| 3,348,034 | 10/1967 | Jensen | 340—172 X |

OTHER REFERENCES

H. Moreines et al., Majority Voting Protects Aircraft and Pilot, Electronics, Vol. 37, No. 16, May 1964, pp. 85–91.

MALCOLM A. MORRISON, Primary Examiner

C. E. ATKINSON, Assistant Examiner

U.S. Cl. X.R.

325—304; 328—152; 340—147, 146.1